United States Patent
Barnum et al.

(10) Patent No.: US 10,965,580 B2
(45) Date of Patent: *Mar. 30, 2021

(54) SYSTEMS AND METHODS FOR AUTOMATED DETERMINATION OF NETWORK DEVICE TRANSITING DATA ATTRIBUTES

(71) Applicant: Capital One Services, LLC, McLean, VA (US)

(72) Inventors: Eric Barnum, Midlothian, VA (US); Terence Banks, Culpeper, VA (US)

(73) Assignee: CAPITAL ONE SERVICES, LLC, Mclean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/731,126

(22) Filed: Dec. 31, 2019

(65) Prior Publication Data

US 2020/0136954 A1    Apr. 30, 2020

Related U.S. Application Data

(60) Continuation of application No. 16/401,032, filed on May 1, 2019, now Pat. No. 10,594,589, which is a
(Continued)

(51) Int. Cl.
*H04L 12/26* (2006.01)
*H04L 29/06* (2006.01)

(52) U.S. Cl.
CPC .......... *H04L 43/50* (2013.01); *H04L 63/0236* (2013.01); *H04L 69/24* (2013.01); *H04L 43/18* (2013.01)

(58) Field of Classification Search
None
See application file for complete search history.

(56) References Cited

U.S. PATENT DOCUMENTS 6,304,575 B1 * 10/2001 Carroll .................... H04L 45/02
370/408
6,359,894 B1 * 3/2002 Hong .................... H04L 49/351
370/389
(Continued)

FOREIGN PATENT DOCUMENTS

WO    20050101789 A1    10/2005

OTHER PUBLICATIONS

Extended European Search Report dated Jan. 17, 2018 for corresponding EP Application No. 17191805.5.

*Primary Examiner* — Backhean Tiv
(74) *Attorney, Agent, or Firm* — Troutman Pepper Hamilton Sanders LLP; Christopher J. Forstner; John A. Morrissett

(57) ABSTRACT

A system for determining network device transiting data attributes includes one or more memory devices storing instructions, and one or more processors configured to execute the instructions to run a first script on all static ports of a network and run a second script on all known ports of the network. The system may parse the parameters returned from the first and second scripts to identify one or more identified ports of the known ports. The system may run a third script on the one or more identified ports to force one or more denials at the identified ports. Based on the one or more denials, the system may determine network device transiting data attributes including but not limited to allowed protocols and directionality for each of the one or more identified ports.

20 Claims, 7 Drawing Sheets

Related U.S. Application Data division of application No. 15/824,412, filed on Nov. 28, 2017, now Pat. No. 10,348,607, which is a continuation of application No. 15/664,635, filed on Jul. 31, 2017, now Pat. No. 9,866,467.

(60) Provisional application No. 62/396,434, filed on Sep. 19, 2016.

(56) References Cited

U.S. PATENT DOCUMENTS

| | | | | |
|---|---|---|---|---|
| 6,789,118 | B1* | 9/2004 | Rao | H04L 45/10 |
| | | | | 370/230 |
| 7,516,211 | B1* | 4/2009 | Gourlay | H04L 41/0816 |
| | | | | 370/356 |
| 7,657,613 | B1* | 2/2010 | Hanson | G06F 3/0605 |
| | | | | 709/220 |
| 7,898,986 | B2* | 3/2011 | Ford | H04L 41/0806 |
| | | | | 370/255 |
| 8,325,630 | B2* | 12/2012 | Khan | H04L 49/552 |
| | | | | 370/256 |
| 8,559,335 | B2* | 10/2013 | Berman | H04L 45/74 |
| | | | | 370/254 |
| 8,656,011 | B2* | 2/2014 | Tomita | H04L 41/022 |
| | | | | 709/224 |
| 8,923,277 | B1* | 12/2014 | Shekhar | H04L 49/10 |
| | | | | 370/352 |
| 9,203,730 | B1* | 12/2015 | Johnson | H04L 43/50 |
| 9,692,660 | B2* | 6/2017 | Friedman | H04L 41/0816 |
| 9,866,467 | B1* | 1/2018 | Barnum | H04L 63/0236 |
| 10,348,607 | B2* | 7/2019 | Barnum | H04L 63/0236 |
| 10,594,589 | B2* | 3/2020 | Barnum | H04L 43/50 |
| 2002/0097687 | A1* | 7/2002 | Meiri | H04L 67/1095 |
| | | | | 370/254 |
| 2005/0081023 | A1* | 4/2005 | Bullis | H04L 43/50 |
| 2005/0154553 | A1* | 7/2005 | Wheeler | H04L 12/2809 |
| | | | | 702/123 |
| 2005/0240799 | A1* | 10/2005 | Manfredi | H04L 41/5009 |
| | | | | 714/4.1 |
| 2006/0031472 | A1* | 2/2006 | Rajavelu | H04L 63/0263 |
| | | | | 709/224 |
| 2006/0048142 | A1* | 3/2006 | Roese | H04L 63/20 |
| | | | | 717/176 |
| 2007/0177523 | A1* | 8/2007 | Nagami | H04L 41/147 |
| | | | | 370/252 |
| 2007/0189288 | A1* | 8/2007 | Andrews | H04L 41/0886 |
| | | | | 370/390 |
| 2008/0095148 | A1* | 4/2008 | Hegde | H04L 41/0856 |
| | | | | 370/360 |
| 2008/0209276 | A1* | 8/2008 | Stubbs | G06F 11/3688 |
| | | | | 714/38.14 |
| 2008/0247395 | A1* | 10/2008 | Hazard | H04L 45/00 |
| | | | | 370/392 |
| 2011/0231715 | A1* | 9/2011 | Kunii | G06F 11/079 |
| | | | | 714/57 |
| 2012/0237213 | A1* | 9/2012 | Yin | H04B 10/071 |
| | | | | 398/28 |
| 2013/0166708 | A1* | 6/2013 | Schlichter | H04L 41/0816 |
| | | | | 709/221 |
| 2013/0343379 | A1* | 12/2013 | Stroud | H04L 43/50 |
| | | | | 370/389 |
| 2013/0343387 | A1* | 12/2013 | Stroud | H04L 45/74 |
| | | | | 370/392 |
| 2014/0019607 | A1* | 1/2014 | Beste | H04L 47/125 |
| | | | | 709/223 |
| 2015/0106518 | A1* | 4/2015 | Amann | H04L 47/70 |
| | | | | 709/225 |
| 2015/0135268 | A1* | 5/2015 | Silverman | H04L 63/08 |
| | | | | 726/3 |
| 2015/0222592 | A1* | 8/2015 | Andrews | H04L 43/08 |
| | | | | 709/221 |
| 2015/0341365 | A1* | 11/2015 | Basso | H04L 29/06 |
| | | | | 711/108 |
| 2016/0057038 | A1* | 2/2016 | Watanabe | H04L 1/1835 |
| | | | | 370/244 |
| 2016/0164910 | A1* | 6/2016 | Tang | H04L 63/1458 |
| | | | | 726/14 |
| 2016/0191314 | A1* | 6/2016 | Russell | H04L 41/0806 |
| | | | | 709/221 |
| 2016/0224363 | A1* | 8/2016 | Joy | G06F 9/45558 |
| 2016/0226704 | A1* | 8/2016 | Astigarraga | H04L 41/0803 |
| 2016/0241563 | A1* | 8/2016 | Barkie | H04L 41/0813 |
| 2018/0048537 | A1* | 2/2018 | Gaikwad | H04L 41/0896 |
| 2018/0083859 | A1* | 3/2018 | Barnum | H04L 63/0236 |
| 2019/0260665 | A1* | 8/2019 | Barnum | H04L 63/0236 |

\* cited by examiner

SYSTEMS AND METHODS FOR AUTOMATED DETERMINATION OF NETWORK DEVICE TRANSITING DATA ATTRIBUTES

CROSS-REFERENCE TO RELATED APPLICATIONS

This application is a continuation of, and claims priority under 35 U.S.C. § 120 to, U.S. patent application Ser. No. 16/401,032, filed May 1, 2019, which is a divisional of U.S. patent application Ser. No. 15/824,412, now U.S. Pat. No. 10,348,607, filed Nov. 28, 2017, which is a continuation of U.S. patent application Ser. No. 15/664,635, now U.S. Pat. No. 9,866,467, filed Jul. 31, 2017, which claims the benefit of U.S. Provisional Patent Application No. 62/396,434, filed Sep. 19, 2016, the entire contents of which are fully incorporated by reference in their entirety.

FIELD OF THE INVENTION

The presently disclosed subject matter relates generally to systems and methods for network analysis, particularly systems and methods for automated determination of network device transiting data attributes.

BACKGROUND

Data communication networks are established with a number of components configured to operate specific applications across one or more sites. Over time, policies and configurations of networks are often lost. The problem is compounded across physical sites including many network appliances. As a result, implementing changes to networks may result in conflicts with desired policies for network operation and application use.

Regarding network and application trouble shooting, the conventional approach is to utilize a highly-skilled and time constrained network engineer to troubleshoot specific applications. For these specialists, a review of network activity is a manual, time-consuming, and error prone process. The specialized nature of review by a network engineer is typically very costly. Moreover, because specific applications, rather than appliances, are typically the focus of analysis often network testing is restricted to "moment in time" reports which risk missing key network parameters and configurations.

Accordingly, there is a need for improved devices, systems, and methods that enable network testing and analysis, and embodiments of the present disclosure are directed to this and other considerations.

SUMMARY

Disclosed embodiments provide systems and methods for network analysis (e.g., automated determination of network device transiting data attributes).

Consistent with the disclosed embodiments, the system may include one or more memory devices storing instructions, and one or more processors configured to execute the instructions to perform steps of a method for automated determination of network device transiting data attributes. The system may execute the instructions to run a first script on all static ports of a network, and the first script may return parameters for the static ports. The system may run a second script on all known ports of the network to return parameters for the known ports. After running the first and second scripts, the system may parse the returned parameters for the static ports and parameters for all known ports to identify one or more identified ports (e.g., port(s) requiring further investigation or analysis). The system may run a third script on the one or more identified ports, and the third script may force one or more denials on the one or more identified ports. Based on the forced one or more denials, the system may determine network device transiting data attributes, which may include allowed protocols and directionality for each of the one or more identified ports.

Consistent with the disclosed embodiments, methods are also provided for automated determination of network device transiting data attributes, as well as, non-transitory computer-readable medium storing instructions that, when executed by one or more processors, cause a computing device to perform methods for automated determination of network device transiting data attributes.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
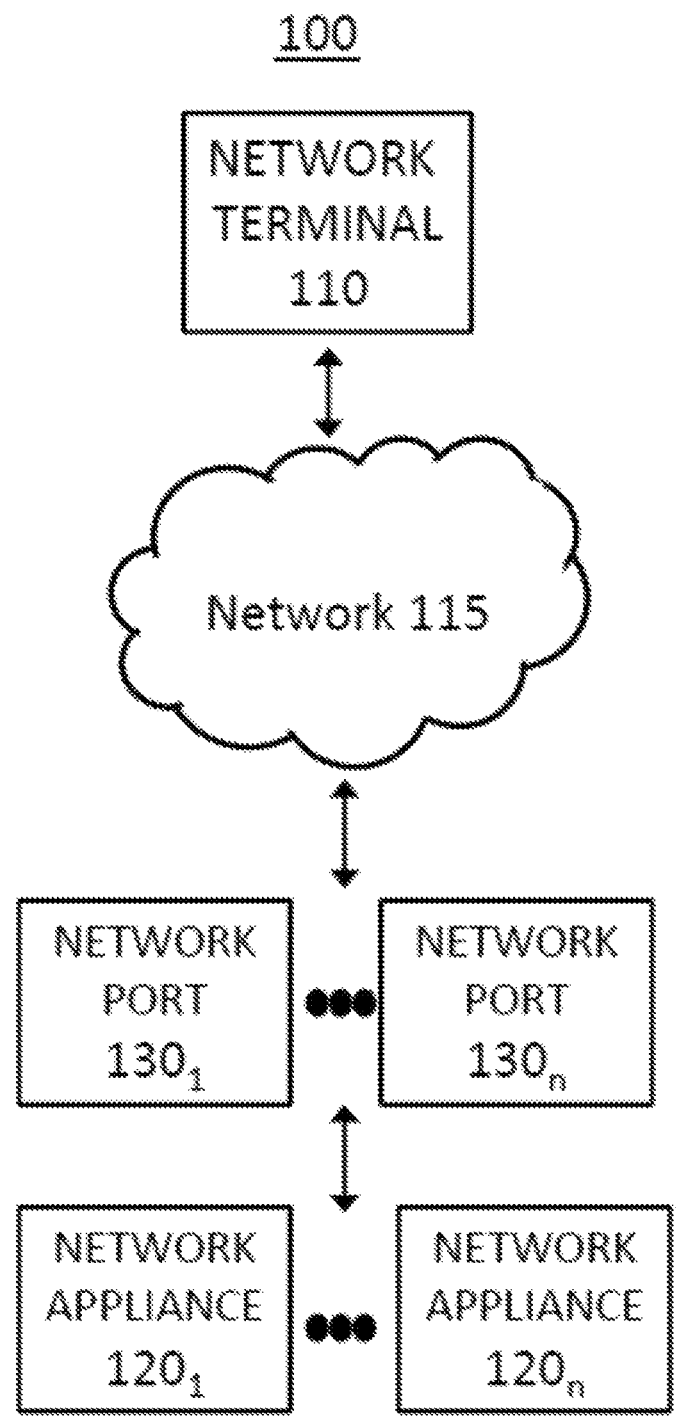
FIG. 1 is a diagram of an exemplary network system.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

As used herein, a network, or network system, refers to physical and virtual components of a computer network.

A network appliance relates to one or more devices, such as but not limited to servers, firewalls, routers, switches, etc., that allow for communication and data transfer for the network. Network devices can include physical and virtual devices.

A port relates to a point of communication within the network or network system. A port can relate to one or more of endpoints and intermediate communication points within a network. Port can refer to physical ports (e.g., hardware device ports) and/or virtual ports (e.g., computer constructs for a specific process or type of service). Static ports are fixed according to one or more network protocols. Dynamic ports are network ports available for use by any application and may be dynamically allocated (e.g., changed) based on programs running on the network for one or more network operations. References to all known ports can include known and unknown ports of the network.

Network rules refer to a set of rules that govern what is allowed and what is not allowed on the network. Network rules may be assigned to ports and appliances of the network. By way of example, firewalls of the network may operate on one or more rule sets that define what is allowed and not allowed through the firewall.

Network anti-pattern refers to exceptions of rules or policies for network traffic. A network, or network system, operates based on network policies and rules created across network domains via firewalls. An anti-pattern is created when business need requires traffic forbidden by policy and/or rules to cross network domains. Anti-patterns can enable traffic that should not be present in certain locations and across certain devices. Anti-patterns may have separate network maintenance requirements and may be susceptible to shadow assets. A network anti-pattern may be indicative of an unintended use of devices on the network.

As used herein, protocols are formal standards and policies comprised of rules, procedures and formats that define communication between two or more devices over a network. Protocols may be employed as data communication standards for the network. Protocols carry data which have attributes that allows for the data to transit the network, network devices and network ports.

Data transiting attributes refers to characteristics of at least one of network ports and devices with respect to port status, allowed status, protocols allowed, input interface type, source IP, source mask, source port, output interface, destination IP, destination mask and destination port. Data transiting attributes can include port directionality and denied network paths for each port. Data transiting attributes can also include identification of a network location of the denial and identification of a denied application.

The disclosed embodiments are directed to systems and methods for network analysis, such as automated determination of network device transiting data attributes. In one aspect, a system for network analysis may include one or more memory devices storing instructions and one or more processors configured to execute the instructions to perform the steps of a method. The system may run a first script on all static ports of a network. The first script may return parameters for the static ports. The system may capture the parameters returned for the static ports of the network. Additionally, the system may run a second script on all known ports of the network. The second script may return parameters for the known ports. The system may capture parameters returned for the known ports of the network. In addition, the system may parse parameters for the static ports and parameters for the known ports to identify one or more identified ports (e.g., ports designated for further investigation or analysis), and run a third script on the one or more identified ports. The third script may force denials on the one or more identified ports. In some embodiments, the third script may force denials on the one or more identified ports to capture allowed protocols and directionality for each port in the set of ports. Based on the denials, the system may determine network device transiting data attributes, which may include allowed protocols and directionality for each port in the one or more identified ports. By doing so, the system may capture allowed protocols and directionality at each of the one or more identified ports. Optionally, in some embodiments, the system may also generate a network identification database based on the determination.

In another aspect, a non-transitory computer-readable medium storing instructions is disclosed. The instructions, when executed by one or more processors, may cause a computing device to perform steps of a method for network testing. Specifically, the computing device may run a first script on all static ports of a network. The first script may return parameters for the static ports. The computing device may run a second script on all known ports of the network. The second script may return parameters for the known ports. Additionally, the computing device may parse the returned parameters for the static ports and the returned parameters for the known ports to identify one or more identified ports of the known ports. The computing device may run a third script on the one or more identified ports. The third script may force one or more denials on the one or more ports. In addition, the computing device may determine, based on the one or more denials, network device transiting data attributes including allowed protocols and directionality for each of the one or more identified ports.

In yet another aspect, a method is disclosed for network testing. The method may include running, via a computing device of a network, a first script on all static ports of the network, wherein the first script returns parameters for the static ports. The method may also include running, via the computing device, a second script on all known ports of the network. The second script may return parameters for the known ports. The method may also include running, via the computing device, a third script on the one or more identified ports. The third script may force one or more denials on the one or more ports. Finally, the method may determine, via the computing device, based on the one or more denials, network device transiting data attributes including allowed protocols and directionality for each of the one or more identified ports.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 shows a diagram of an exemplary system that may be configured to perform one or more software processes that, when executed, analyze network ports and appliances of network system 100 (e.g., for automated determination of network device transiting data attributes). The components and arrangements shown in FIG. 1 are not intended to limit the disclosed embodiments as the components used to implement the disclosed processes and features may vary.

In accordance with disclosed embodiments, a network system 100 may include one or more network terminals, such as network terminal 110, configured to communicate with one or more network appliances $120_{1-n}$ over a network 115, and network terminal 110 may access one or more of those network appliances $120_{1-n}$ through one or more network ports $130_{1-n}$. That is, network ports $130_{1-n}$ may serve as communication gateways for transiting data within network 115, and each network ports $130_{1-n}$ may allow (or disallow) specific protocols and directionality. In some embodiments, network 115 may be a defined, finite network (e.g., a local-area-network, an intranet, etc.), though it is contemplated that the disclosed methods and systems may be applicable to any network. In one embodiment, network system 100 may relate to a network of computer devices and network based communication modules for an entity, such as a financial services provider. According to another embodiment, network system 100 and the methods described herein may be configured for testing all network ports $130_{1-n}$, whether physical or virtual, within network system 100 and generation of a network identification database for all known ports of network system 100.

According to one embodiment, a network identification database may be generated to identify and store attributes associated with network appliances $120_{1-n}$ and/or network ports $130_{1-n}$. For example, in some embodiments, the network identification database may store parameters for network ports $130_{1-n}$ to account for active and inactive ports, application use within network system 100, and directionality of network ports $130_{1-n}$.

Network terminal 110 may be a network location for analyzing network system 100. In other embodiments, network analysis (e.g., determinations of network device transiting data attributes) described herein may be performed at any network location within network system 100.

Operating in communication with network 115, network terminal 110 may be a computer-based system. For example, network terminal 110 may include a general purpose or notebook computer, a mobile device with computing ability, a server, a desktop computer, tablet, or any combination of these computers and/or affiliated components. In one embodiment, network terminal 110 may be a computer system within a system 100 that is operated by a financial service provider. Network terminal 110 may include one or more storage devices that stores one or more operating systems that perform known operating system functions when executed by one or more processors. By way of example, the operating systems may include, but is not limited to, Microsoft Windows™, Unix™, Linux™, Apple™ operating systems, Personal Digital Assistant (PDA) type operating systems, such as Microsoft CE™, or other types of operating systems. Accordingly, disclosed embodiments may operate and function with computer systems running any type of operating system. The network terminal 110 may also include communication software that, when executed by a processor, provides communications with network 115, such as Web browser software, tablet software, or smart hand held device networking software, etc.

As shown in FIG. 1, network appliances $120_{1-n}$ may include servers, routers, data servers, computer terminals, or other computer-based systems, and may be configured store one or more applications that can be accessed via network 115. Each network appliance $120_{1-n}$ includes one or more network ports 1301, which allow devices to communication over network 115. Network ports $130_{1-n}$ can include static ports, such as ports assigned or fixed to specific applications. By way of example, a network protocol (e.g., TCP/IP, SSH, etc.) employed by network 115 may define configure a particular function to a port number. Network ports $130_{1-n}$ can also include dynamic ports, such as dynamic ports associated with network protocols (e.g., dynamic port range of TCP/IP, etc.).

Network 115 may comprise any type of computer networking arrangement used to exchange data. For example, network 115 may be the Internet, a private data network, or a virtual private network using a public network such as the Internet. Network 115 may also include a public switched telephone network ("PSTN") and/or a wireless network.

To communicate over network 115, a computing device associated with network terminal 110 may transmit and receive communications and data over wired and/or wireless communication links.

Figure 2:
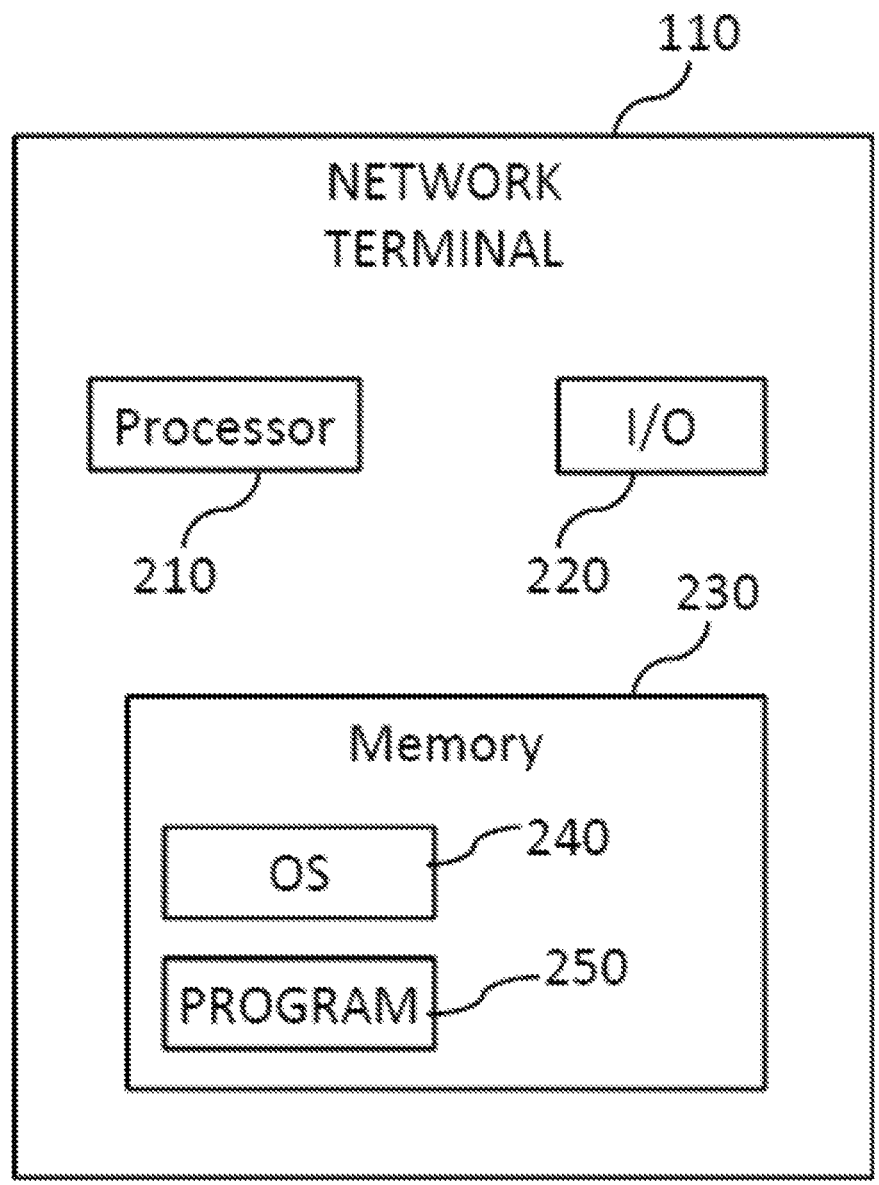
FIG. 2 is a component diagram of an exemplary network terminal.

Network terminal 110 is shown in more detail in FIG. 2 which shows a component diagram of an exemplary network terminal. As shown, network terminal 110 may include a processor 210, an input/output ("I/O") device 220, a memory 230 containing an operating system ("OS") 240 and a program 250. For example, network terminal 110 may be a single server or may be configured as part of a distributed computer system including multiple servers or computers that interoperate to perform one or more of the processes and functionalities associated with the disclosed embodiments. In some embodiments, the network terminal 110 may further include a display (or a display interface), a peripheral interface, a transceiver, a mobile network interface in communication with the processor 210, a bus configured to facilitate communication between the various components of the network terminal 110, and a power source configured to power one or more components of the network terminal 110.

A mobile network interface of network terminal 110 may provide access to a cellular network, the Internet, or another wide-area network. In some embodiments, a mobile network interface may include hardware, firmware, and/or software that allows the processor(s) 210 to communicate with other devices via wired or wireless networks, whether local or wide area, private or public, as known in the art. A power source of network terminal 110 may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. In another embodiment, processor 210 may include a multiple-core processor arrangement (e.g., dual or quad core) that is configured to provide parallel processing functionalities to allow server 200 to execute multiple processes simultaneously. One of ordinary skill in the art would understand that other types of processor arrangements could be implemented that provide for the capabilities disclosed herein.

Network terminal 110 may include one or more storage devices configured to store information used by processor 210 (or other components) to perform certain functions related to the disclosed embodiments. In one example, network terminal 110 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, network terminal 110 includes memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, network terminal 110 may include memory 230 that may include one or more programs 250 to perform one or more functions of the disclosed embodiments. Moreover, processor 210 may execute one or more programs 250 located remotely from network terminal 110.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft SQL databases, SharePoint databases, Oracle™ databases, Sybase™ databases, or other relational databases. Memory 230 may include software components that, when executed by processor 210, perform one or more processes consistent with the disclosed embodiments.

Network terminal 110 may also be communicatively connected to one or more memory devices (e.g., databases (not shown)) locally or through a network. The remote memory devices may be configured to store information and may be accessed and/or managed by financial service network terminal 110. By way of example, the remote memory devices may be document management systems, Microsoft SQL database, SharePoint databases, Oracle™ databases, Sybase™ databases, or other relational databases. Systems and methods consistent with disclosed embodiments, however, are not limited to separate databases or even to the use of a database.

Network terminal 110 may also include one or more I/O devices 220 that may comprise one or more interfaces for receiving signals or input from devices and providing signals or output to one or more devices that allow data to be received and/or transmitted by network terminal 110. In exemplary embodiments of the disclosed technology, the network terminal 110 may include any number of hardware and/or software applications that are executed to facilitate any of the operations.

While network terminal 110 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the network terminal 110 may include a greater or lesser number of components than those illustrated.

Figure 3:
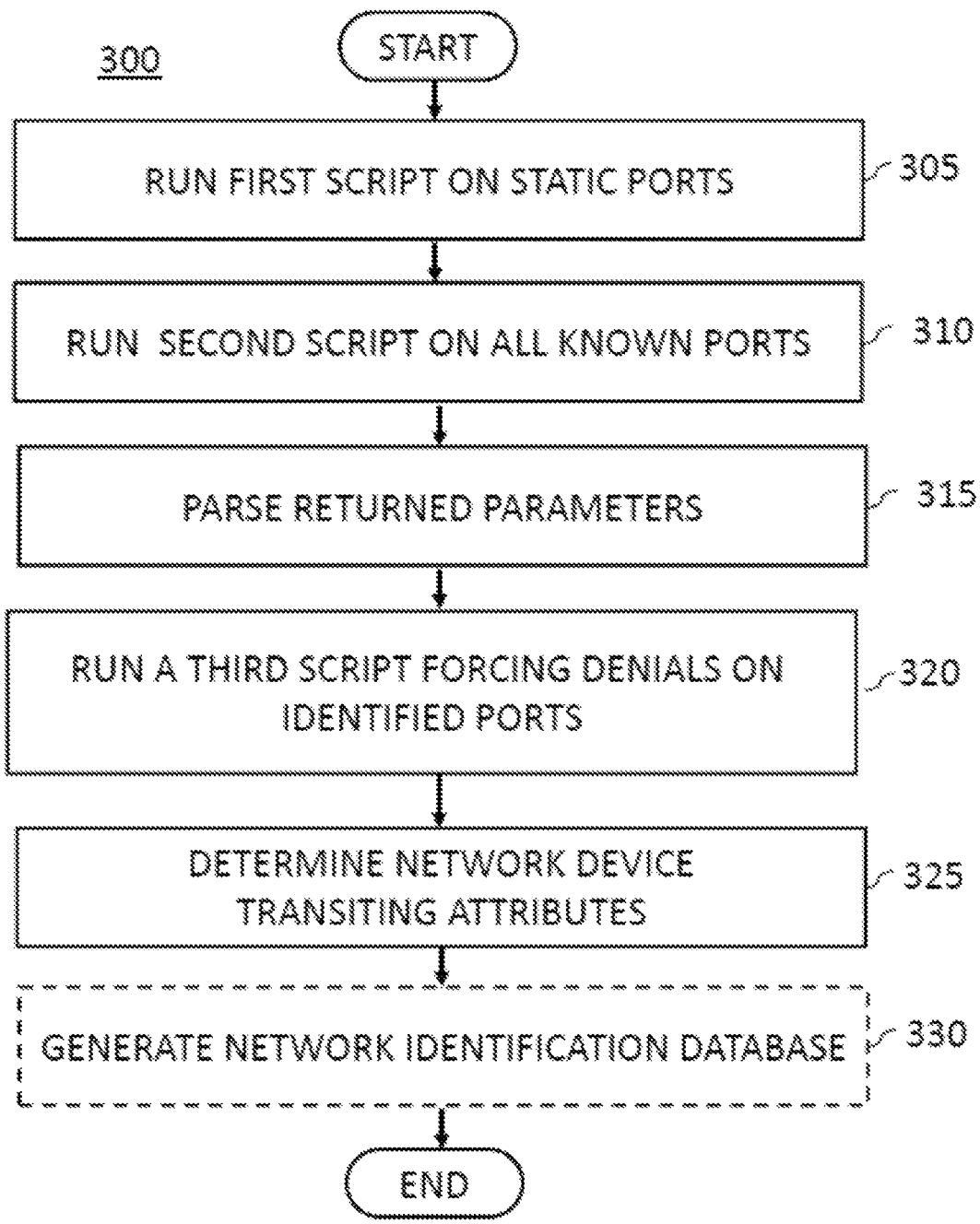
FIG. 3 is a flowchart of an exemplary method for network analysis.

FIG. 3 shows a flowchart of method 300 for network analysis. Method 300 may be performed by network terminal 110, or similarly by one or more of network appliances $120_1$, using processor 210 to execute memory 230. Method 300 may determine network device data transiting attributes for one or more identified ports (e.g., network ports $130_{1-n}$) of network system 100. Although FIG. 3 is discussed below with respect to operation by network terminal 110, it should be appreciated that network appliances $120_{1-n}$ or other computing devices may be configured to generate scripts and capture parameters for ports (e.g., network ports $130_{1-n}$) of a network system (e.g., network system 100). In some embodiments, exemplary devices used to facilitate method 300 include, but are not limited to, switches, routers, firewalls, and virtual entities of the network. According to one embodiment, method 300 includes script files defined by a configuration file. The configuration file of each script file can define protocols, device types and devices to be tested. In addition, each configuration file and script file may be employed for both physical and virtual entities recognized by the network. In that fashion, network entities associated with cloud services may be evaluated.

In block 305, the network terminal 110 may run a first script on all static ports of a network (e.g., network 115). In practice, in some exemplary embodiments, this first script may confirm an analyst's understanding of the static ports of a network, and serve as a baseline for reference or comparison. The first script may be a static port script configured to return parameters for the static ports (e.g., run 'show access-list in permit'). In one embodiment, the first script may be loaded, targeted to, and run by a configuration file including network test parameters to identify static port parameters for one or more of an allowed state of a static port, protocol, input interface, source protocol, source mask, source port, output interface, destination protocol, destination mask and destination port. For example, the first script may return parse-able data that can then be organized into the above-noted parameters confirming what is known about the static ports. In response to the first script in block 305, a device, such as a network terminal 110, may capture parameters returned for the static ports of the network. The first script on all static ports may return path and destination addresses for all static ports of the network. In one embodiment, static ports may include network destinations and firewall locations of the network.

A particular network (e.g., network 115) may have a finite (though extensive) list of network protocols, and parameters may be returned at each static port for one or more of the network protocols. Parameters returned by static ports in response to the first script may be captured in one or more log files. In one embodiment, parameters returned by the first script may include a time progression of the first script relative to the network.

The system 100 (e.g., via network terminal 110) may run a second script on all known ports (e.g., all possible static ports and all possible virtual ports) of the network 115 in block 310. The second script may return parameters for the known ports exclusive of the first script. In doing so, the second script may provide a snapshot view of all known ports and their attendant attributes on the network, making it easier to identify ports that require further analysis or investigation. The system (e.g., via network terminal 110) may capture parameters returned for the known ports of the network. The second script run on all known ports may return path and destination addresses for all ports of the network and identify temporarily allowed sessions for each port. The known ports of the network 115 may include one or more of known active, virtual, and non-active ports of the network Like block 305, the parameters returned at each known port may be for one or more network protocols. Running the second script in block 310 can provide additional detail of network parameters. In one embodiment, the first script run in block 305 and the second script run in block 310 are based on the same configuration file, however the script of block 305 is for static ports and the script of block 310 is for known ports. By running a script on two different sets of ports, such as static ports first and then known ports, output of the scripts can be compared to identify ports and port attributes. Similarly, according to another embodiment, comparison of output from running scripts can be used to identify shadow assets, network rule violations and/or anti-patterns. Outputs of running scripts can include status for each port analyzed such as one or more of active, denied, listening, etc. According to another embodiment, data returned for a port analyzed can include a string of values for each protocol being tested. Thus, according to one embodiment, comparison of port status, comparison of port values, and/or comparison of port protocols allowed by an analyzed port.

In block 315, the system 100 (e.g., via network terminal 110) may parse the returned parameters for the static ports and the returned parameters for the known ports to identify one or more identified ports (e.g., ports that require further analysis or investigation). For example, if running the second script returns parameters indicative of a potential issue (e.g., a shadow asset, a repurposed asset, a nonresponsive asset, a new asset, etc.) on a particular port on the network, the system 100 may identify that port as one requiring further analysis. In that fashion, port and network activity can identify use of a network by shadow assets or entities that are not allowed and/or are unknown to the network. Parsing pulls required data from the returned parameters such that the system 100 can identify the one or more ports that require further analysis. In some embodiments, parsing the returned parameters includes generating output such as a text report that may enable a user (e.g., a network engineer or a layperson) to read and comprehend otherwise incomprehensible computer outputs. In contrast to standard log output files containing exhaustive data incomprehensible in its volume, parsing as described herein can utilize scripts output to provide status for each port analyzed (e.g., active, denied, listening, etc.) and/or indications of for each protocol being tested. Furthermore, under normal network conditions, the circumstance of the first and second script will confirm as-is network states while spotlighting variances where policy, rules, and other established control mechanisms have failed or will fail. By using targeted first and second scripts, the output logs occurring subsequent to script runs can be captured and parsed specific to the first and second scripts creating a target/hit view report usable by downstream systems for attributes of interest. Exemplary attributes of interest include, but are not limited to allowed state of a static port, protocol, input interface, source protocol, source mask, source port, output interface, destination protocol, destination mask and destination port. In one embodiment, the one or more identified ports are identified based on protocol and device type to target one or more of network ports and network appliances. Ports are identified by either a configuration file targeting a specific network device and range of ports, or by a systematic increment of start to end ports for all known and possible ports.

According to another embodiment, the parameters captured through the course of method 300 (e.g., by network terminal 110) may provide an inventory of active and inactive ports, applications, and devices operating in the network 115. Using the network identification database, a network terminal 110 can identify one or more shadow assets operating on the network, which may improve network security or identify misused or lost assets that could be utilized elsewhere. Unlike existing systems, network terminal 110 may be able to use the network identification database to identify these shadow assets regardless of whether they are currently active. Parsing of parameters in block 315 can identify shadow assets operating in network 100. Differences determined from output returned by the first and second script can be used to identify possible shadow assets. In one embodiment, the third script may be used to test and analyze allowed parameters in a possible shadow asset.

In block 320, the system 100 (e.g., via network terminal 110) may run a third script to force one or more denials on the one or more ports identified in block 315. The third script is run in block 320 to capture allowed protocols and directionality for each of the identified ports. Rather than providing a snapshot view of all known ports, the returned parameters from running the third script may provide a detailed view of a particular port or set of ports in some embodiments. In fact, in some embodiments, the return parameters from running the third script may enable the system to identify one or more denied network paths for each of the identified ports (or, potentially, for all known ports of the network). The system 100 may determine directionality for all known ports of the network using parameters captured from the first script, the second script, and the one or more denied network paths. Any returned result by protocol and any known port can be bi-directionally tested by the third script. By way of example, directionality may be determined based on output of the third script that indicates a denial one pathway from a port and with any other state return for the other direction of the port. For each denial on the one or more identified ports, the third script may return output providing an indication of the denial, identification of a network location of the denial, and identification of a denied application. In one embodiment, shadow assets identified in block 315 may be confirmed in block 320 based on one or more forced denials in block 320. In one embodiment, based on the differences between the first script testing static ports and the second script testing all ports (e.g., including known and possible ports), unknown or impossible ports may be determined based on network policy or rules. Furthermore, testing unknown ports may uncover valid equipment and network traffic. The third script may be configured to identify all possible allowed attributes for unknown ports.

In block 325, based on the one or more denials, the system 100 may determine network device transiting data attributes, which may include allowed protocols and directionality for each of the one or more identified ports. In some embodiments, this may involve capturing (e.g., via network terminal 110) the allowed protocols and directionality for each of the identified ports. Captured parameters in block 325 may be employed for providing parameters associated with the allowed protocols and directionality for each port in the set of ports into a database.

In block 330, the system 100 (e.g., via network terminal 110) may optionally generate a network identification database based on the determined network device transiting data attributes from block 325. By logging these data attributes in a database, the system may be able to advantageously track captured data attributes over time, which can be vital for understanding resource utilization over time and to improve understanding of network ports $130_{1-n}$ and network appliances $120_{1-n}$ that are periodically inactive and may otherwise go unnoticed. For example, in normal network monitoring only the known traffic traversing a device at the moment of monitoring is captured. System 100 allows for a much broader and more reliable capture of network traffic by testing all possible ports on all possible devices when needed, rather than fishing for the test condition of interest. By parsing and storing this data over time, the normal state of any network device or network itself can be understood and used to alert changes, better target changes, and test outcomes in a way not possible at this time. For example, if some change in traffic routing is made, system 100 allows a hypothetical test to see what unintended consequences of that change occur in a non-live system. Otherwise, such changes and knowing their impacts are not possible until deployed in a real network. Anti-patterns and shadow assets occur around trouble-shooting the intended outcome of a change because the focus is the intended change. The network identification database may provide port parameters for all of the known ports, the port parameters including one or more of a port stable state, a port determination route, machine learning, a location path, and destination addresses for each of the known ports of the network. It is contemplated that, in some embodiments, a database aggregator may store all logs which are generated by the system, and the collection of logs may be parsed/mined for more in depth decision making. In other embodiments, for example in smaller or less expensive networks, the logs may be discarded after a certain date.

The network identification database generated at optional block 330 may allow for identification of ports and denials within the network system. In addition, based on the network identification system applications may be analyzed and corrected within the network. For example, a network terminal 110 may receive an application and one or more application parameters for operation on the network. Application operability may be determined using the network identification database and network terminal 110 may provide an operability report for the application. The operability report may identify application interoperability on the network. The network identification database generated at optional block 330 may be used to assess the current state of network infrastructure and may be employed to assess changes, additions and removal of user functionality to a network.

Generating the network identification database at optional block 330 may involve parsing outputs from the returned scripts to identify and add human-readable data attributes, such as allowed protocols and directionality for each port based on the script forcing denials and collected logs, to the database. Parsing will generally occur in the standard device output logs, but can be device manufacturer and brand specific. The real advantage of parsing is the ability to discard normal network traffic separately from the output parameters of the first, second and third scripts. According to one embodiment, captured data attributes can include one or more of an indication of allowed static ports, allowed protocols, input interface type, source IP, source mask, source port, output interface, destination IP, destination mask and destination port.

In one embodiment, method 300 also includes scheduling run time of the first script, the second script, and the third script for timed targeting. Scheduling of run time can provide timed targeting during low system resource usage windows. In an exemplary embodiment, one or more of the first script in block 305, second script in block 310 and third script in block 320 are run during a low system resource period. Further, the system 100 may run the scripts at various times within a predetermined time window to better identify shadow assets or other unknown devices that are periodically active on network 115 and may otherwise not be detected. In one embodiment, one or more of the first script, the second script, and the third script may be run automatically on a schedule. In other embodiments, scripts may be run as needed.

Figure 4:
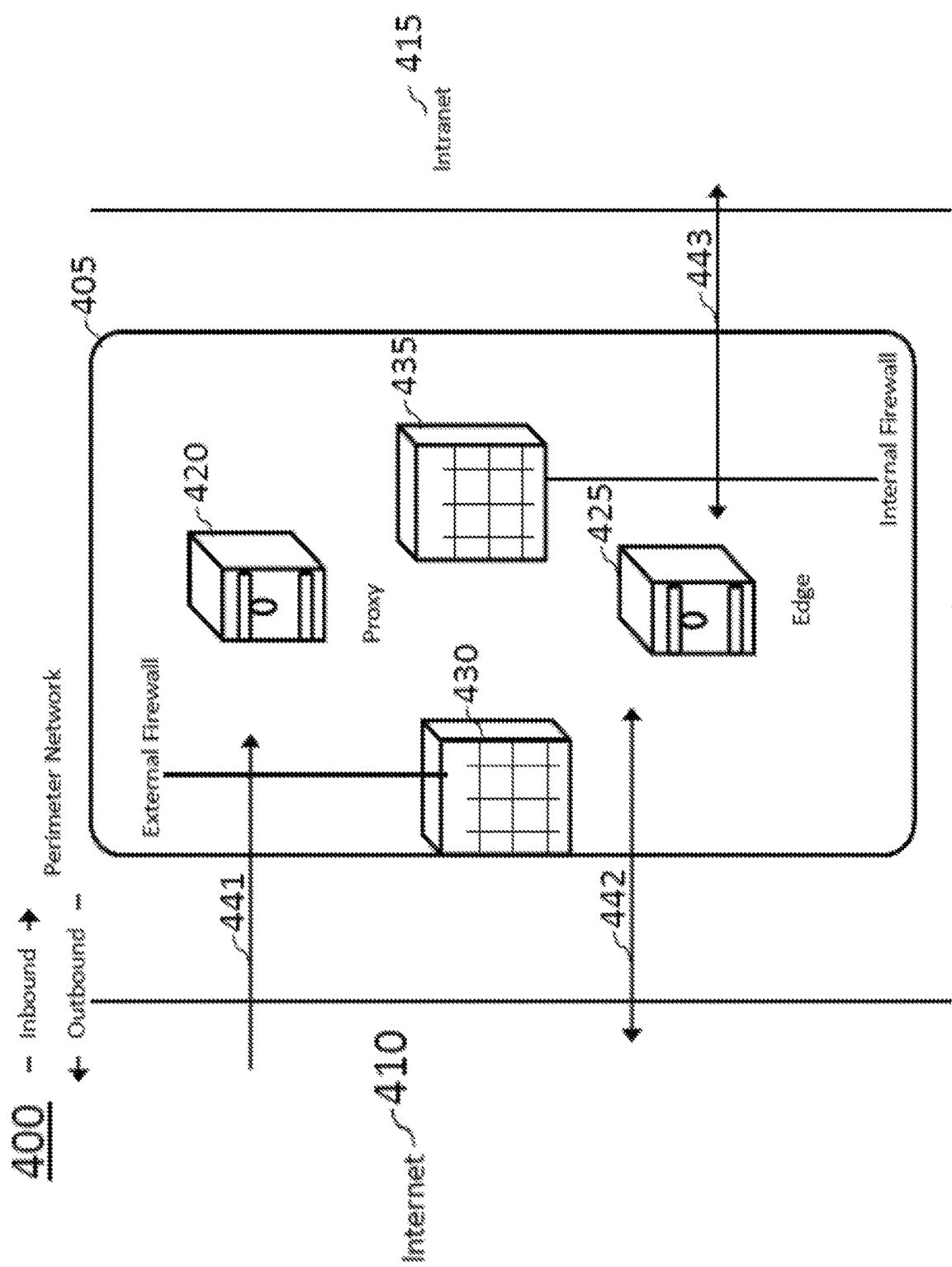
FIG. 4 is an exemplary diagram of communication over a network.

FIG. 4 is an exemplary diagram of communications over a network according to one or more embodiments. A network system 400 can include a perimeter network 405 to control access from the internet 410 (or a larger network) to an intranet 415. As shown in FIG. 4, perimeter network 405 may include one or more servers, such as a proxy server 420 and edge server 425. Perimeter network 405 may also include one or more firewalls, such as external firewall 430 and internal firewall 435.

In some embodiments, network system 400 may perform method 300 to determine attributes of a perimeter network 405 established between internet 410 and intranet 415. Further, when method 300 includes generating a network identification database, the system may be configured to store parameters related to firewall access and domain information of perimeter network 405. In that fashion, processes, priority, and policy bridges may be captured (and optionally logged) for analyzing and troubleshooting the network. Ongoing changes to firewall domains, such as changes to one or more of external firewall 430 and internal firewall 435, may also be captured by the network system 400, and optionally stored in the network identification database. According to one embodiment, a firewall domain refers to one of an inbound and outbound firewall.

FIG. 4 also shows inbound and outbound communications relative to perimeter network 405 and intranet 415. According to one embodiment, scripts run on ports of network system 400 may provide output files for various network communications of perimeter network 405, internet 410, and intranet 415, for example, as shown in FIG. 4. Communication 441 relates to an inbound communication subject to external firewall 430. Communication 442 relates to inbound and outbound communications that are not subject to external firewall 430. Communication 443 relates to inbound and outbound communications relative to internal firewall 435. When multiple firewall domains are present in a network 400, such as external firewall 430 and internal firewall 435, identifying base states of the network 400 can present challenges. In addition, traversal routing between domains of a network can complicate determination of network base states.

Communications within and relative to the perimeter network 405 may be captured (and optionally logged) within output files to identify sessions, port availability, and denied network paths. By running scripts on ports of a network, including ports of perimeter network 405, network device transiting data attributes can be determined. In addition, a network identification database may be generated (e.g., at block 330 in method 300) to log firewall configuration change (e.g., delta) impacts to inbound and outbound to communications 441, 442, 443. As such, determined network device transiting data attributes can provide a baseline understanding of network components and attributes that overcomes the manual and time-consuming approach for mapping by a network engineer. Determined network device transiting data attributes can also provide details for each of the identified ports, further saving time for a network engineer. The parsed output of the determined network device transiting data attributes may allow for human readable formatting that a layperson or network engineer can more easily comprehend. In addition, attributes of the network stored by network identification database may allow for more convenient tracking base and delta states of the network over time. Similarly, attributes of the network stored by the network identification database may allow for tracking firewalls, such as external firewall 430 and internal firewall 435, and sources of data change properties over time.

Figure 5:
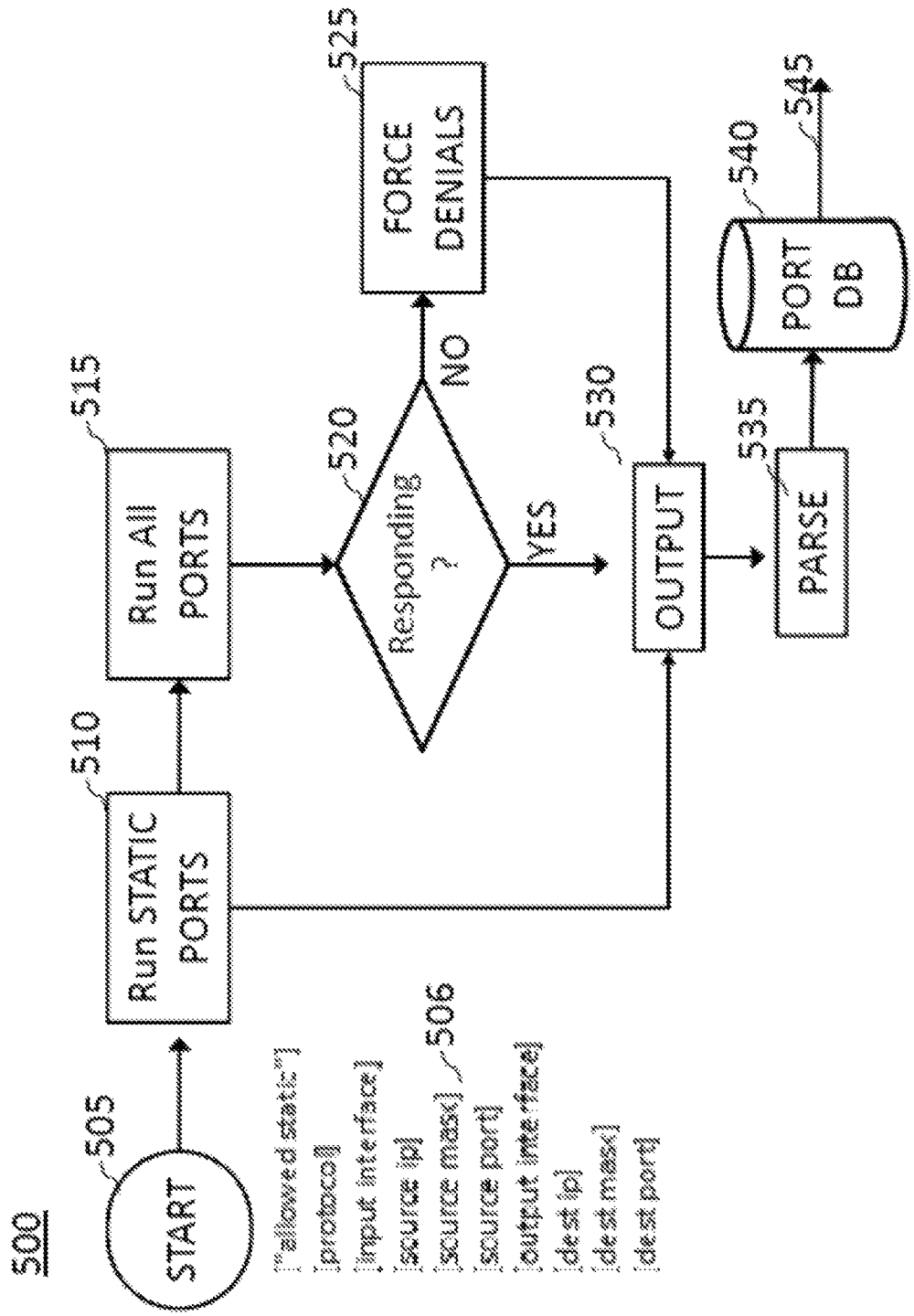
FIG. 5 is a flowchart of an exemplary method for network testing to generate a network identification database.

FIG. 5 shows a flowchart of an exemplary method 500 for network analysis which can optionally include generating a network identification database. Method 500 may be performed by a network terminal 110, using processor 210 to execute memory 230. Following method 500, the network identification database can provide information to provide operability of an application on a network system. At block 505, method 500 is started and a first script is run for all static ports at block 510. Scripts for analyzing the static ports at block 510 may include a configuration file for a plurality of test parameters. In one embodiment, the script on all static ports at block 510 may be run to provide a baseline of network attributes that are captured and which may be logged and parsed. According to one embodiment, script parameters 506 can include parameters for one or more of an indication of allowed static, the protocols allowed, input interface type, source IP, source mask, source port, output interface, destination IP, destination mask and destination port. Accordingly, the static ports script at block 510 may return parameters for the static ports such as an allowed state of a static port, protocol, input interface, source protocol, source mask, source port, output interface, destination protocol, destination mask and destination port. The static ports script at block 510 may return parse-able data that can then be organized into the above-noted parameters.

At block 515, a second script may be run on all ports of the network system. The second script can provide a baseline of network attributes for all known ports (e.g., static and virtual) on the network. As part of the second script or as a third script based on results returned from the second script, the system may identify one or more denied network paths. By way of example, the system may force one or more denials on one or more of the ports (or, for example, all ports) to capture allowed protocols and to determine directionality for all known ports. Forcing denials can provide insight into operability of an application within the network. In addition, the denials may identify unintended outcomes of the network infrastructure. In one embodiment, blocks 510 and 515 may run scripts on the network during periods of low use to avoid interfering with business use of the network and to assess a network when network appliances are not burdened. Output from blocks 510 may provide the source and destination for each port. These outputs may not show inbound/outbound indications (e.g., directionality). As will be discussed below, directionality may be determined based on script configured to identify denied paths.

Based on script(s) run at block 515, the system may determine port responses at decision block 520. Ports responding to any of the scripts may be output to block 530 as a temporary output. Ports responding with denials are output to block 525 as forced denials. Forced denials may be output by block 525 to output block 530. The output collected at block 530 may be parsed at block 535 to provide a human-readable output identifying directionality for all known ports.

In one embodiment, after parsing the returned data attributes at block 535, the system may identify ports of the network, determine directionality of traces relative to the ports, and determine processes, priority, and policy bridges for the network. Parsing at block 535 may include determining whether any application or data source is active in the firewall architecture, where the application or data source can be deployed with the least impact, and whether the application or data source is supposed to be active or closed at locations. Parsing at block 535 may include determining the traffic (e.g., type, protocol, etc.) for any given network device ports and in which direction are the ports open, and level of activity for any given network device, application and data source. Parsing of parameters at block 535 may include parameters returned from a first script and parameters returned for the second script.

Optionally, in some embodiments, the system may generate/update a network identification database 540 to include identification of ports. Parameters 545 of network identification database 540 may be output for use by the system for development and troubleshooting of the network. The network identification database 540 may provide several benefits including, saving time and effort for reviewing every firewall to identify port setting requirements before any proposed change, saving time and effort for analyzing and determining best/easiest match for any proposed change, and saving time and effort for understanding relative effort of a proposed change and avoiding rework. By better targeting of firewall work, risk of change impacting non-related domains and services decreases. In addition, once a security risk is identified in network identification database 540, that same risk may be screened across all firewall boundaries to identify "best match" for the risk, resulting in faster hardening efforts.

The network identification database 540 may store parameters captured from network testing and determinations for ports. According to one embodiment, stored parameters in database 540 may be employed for one or more of determining network steady state, researching unintended consequences, fastest route mapping, redundant route spotlighting, network rollback, simulating network changes, identifying best change targets, identifying shadow assets and determining operability within a network.

Figure 6:
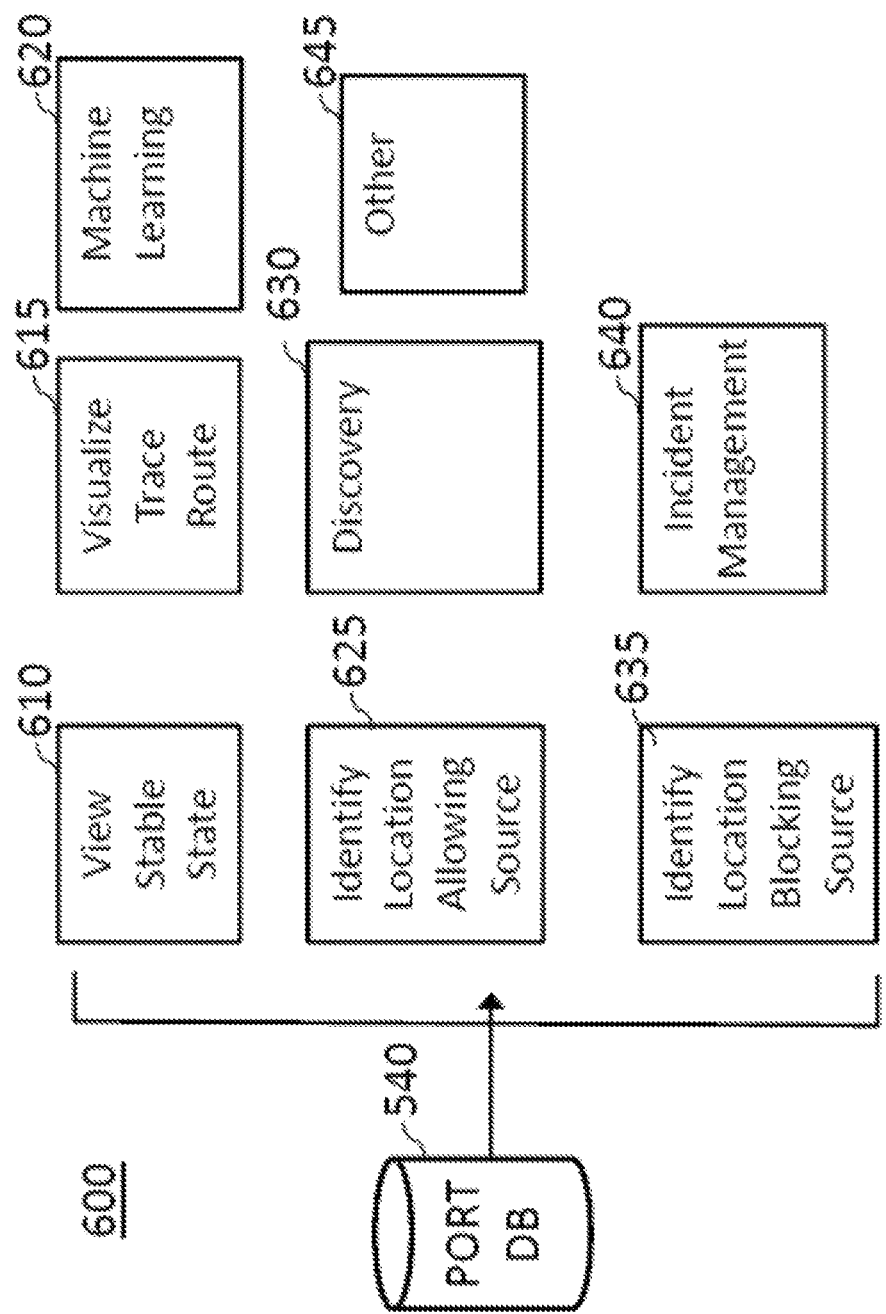
FIG. 6 shows a diagram of database parameters in accordance with an exemplary embodiment.

FIG. 6 shows a diagram of database parameters 600 in accordance with an exemplary embodiment for a network identification database 540. Database parameters 600 may capture network and traffic attributes in a data source to provide a unified view of a network. Network identification database 540 may provide a searchable system to make use of network parameters. These parameters are generated based on an approach that identifies intended and unintended outcomes of the network. As such, the parameters provide can be used for "what if" scenario modeling and can support multiple enterprise objectives. According to one embodiment, the network identification database 540 stores parameters to allow for verification of targets and characterizing changes or deltas to a network. Target verification, for example can include location of a target based on a known source, known destination and/or known IP address. Delta analysis can include determining where it is easiest to deploy an application, assessing the effort to deploy a delta by seeing what the baseline match allowing re-use where right now it is redundant, assessing where any given delta exists by closest match, and a regression delta to assess an entire network after a deployed delta flagging any and all changes.

Parameters of network identification database 540 may be presented graphically, with lists, and/or in a formatted presentation. View stable state 610 may provide parameters of one or more stable states of the network. Visualize trace route 615 may provide a graphical presentation of network ports and termination points. Machine learning 620 may provide information that may be used for network applicants to improve operation. Identify location allowing source 625 may provide network locations (e.g., physical, geographic, etc.) that allows for an application to be run. Discovery 630 may allow for identification of applications and devices (e.g., approved or otherwise) that are present or operating on the network. Identification location blocking source 635 may provide parameters that may identify firewalls or other blocks to operation within the network. Incident management 640 may allow for identification of changes that did not result in desired operation of the network. Parameters of network identification database 540 may also provide other parameters 645 to allow for network testing and assessment.

Figure 7:
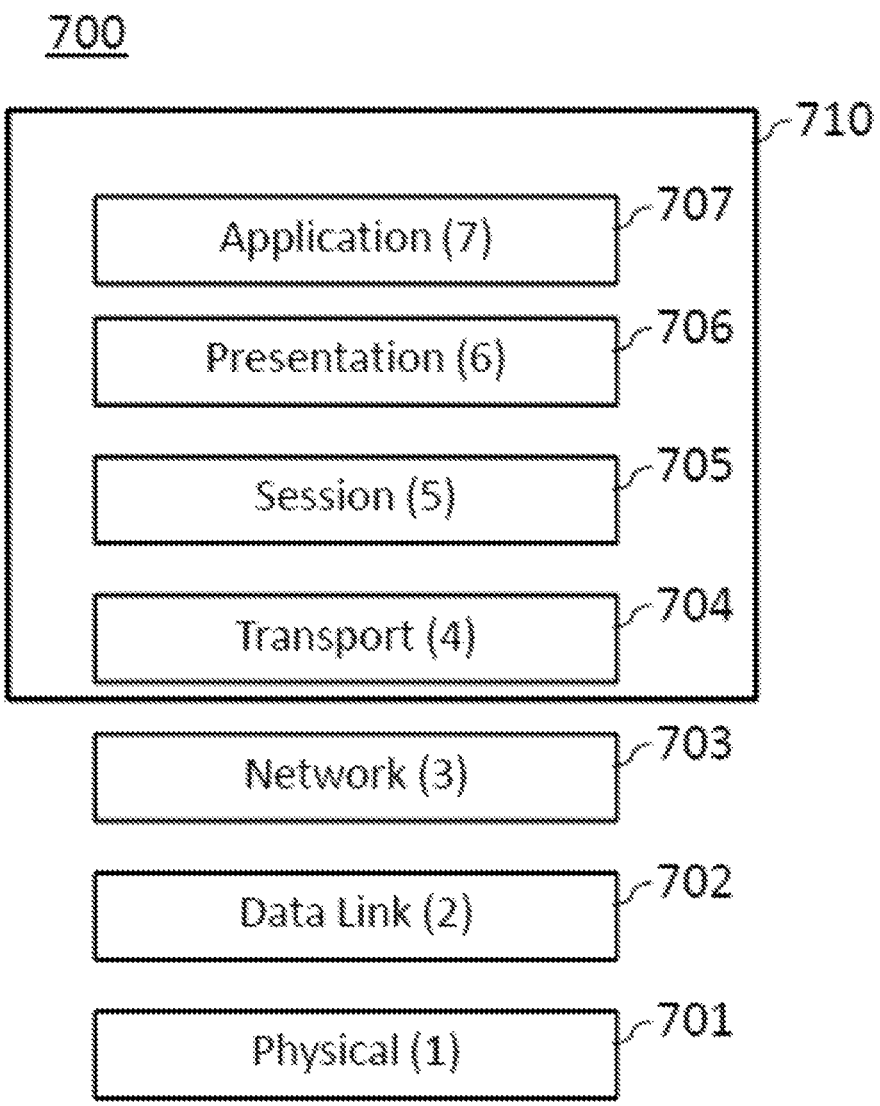
FIG. 7 shows a diagram of network layers in accordance with an exemplary embodiment.

FIG. 7 shows a diagram of network layers 700 in accordance with an exemplary embodiment. Network layers 700 relate to the Open Source Interconnection (OSI) 7 layer model. FIG. 7 shows a physical layer 701, a data link layer 702, a network layer 703, a transport layer 704, a session layer 705, a presentation layer 706, and an application layer 707. In one embodiment, scripts as described herein may include testing protocols of one or more network layers 700. For example, one or more of network system 100, network terminal 110, method 300 and method 500 include and/or are configured for running scripts to determine network device transiting data attributes of one or more ports on a network, and the network device transiting data attributes may include protocols of one or more network layers 704-707, as shown by area 710 from the OSI Network Model. In an exemplary embodiment, scripts run including test parameters for network layers 704-707 allows for parameters of each layer to be captured. By way of example, in some embodiments, scripts can be run to capture TCP, host to host and flow control parameters associated with transport layer 704. Scripts can be run to capture parameters for session establishment between processes running on different stations associated with session layer 705. Scripts can be run to capture parameters for formatting of data associated with presentation layer 706. In yet another embodiment, scripts can be run to capture parameters for application processes to access network services associated with application layer 707.

Exemplary Use Case

The following exemplary use case describes one example of a typical user flow pattern. It is intended solely for explanatory purposes and not in limitation. In this example, an entity may desire to analyze a network using the system described herein. The entity may access the system (e.g., system 100) and run one or more scripts on the network using the system (e.g., via network terminal 110). A first script may be configured to run on all static ports of the network. In response to the first script, the system may return parameters associated with the static ports of the network, thereby providing a baseline of communications over static ports of the network. A second script may then be run on all known ports (e.g., static and virtual ports) of the network, and the system may return parameters associated with all known ports of the network. The system may parse the returned parameters from the first and second scripts to identify one or more identified ports that require further analysis or investigation. By way of example, the first script may be run to confirm what is already known about the network from individual network devices up to the entire network. In addition, at this level of network analysis, running the first script may illuminate gaps in policy understanding or documentation for changes to known network states.

By way of further example, considering a firewall that allows traffic by enterprise policy on specified ports (e.g., ports 10-25). The first script can confirm what is happening on the specified ports (e.g., ports 10-25) because the specified ports may have a reasonable certainty as to their use and network policy. This maintains the known state of the network accounting for any recent changes. With respect to the second script, that same firewall may be analyzed for all possible ports and with all known possible protocols including the specified ports (e.g., ports 10-25) to illuminate any deviations. As a result, running the second script can reaffirm findings in the first script and may also highlight one or more protocols that are now allowed which should not be allowed or that are not documented. Additionally, all physical and virtual ports up to the maximum limit will be tested. By policy, in an exemplary embodiment all possible ports above 25, for example, should be closed. Thus, any return of any state besides null (totally closed not activated) for these ports would be interesting. In this example, a range of virtual ports may have been created off port 109. The second script may identify port 109 as active and return parameters indicating protocols lacking designations to the virtual port range, and the second script can further result in a parameter indicating failure to test (e.g., denied path, etc.). As a result, a status of active or listening or blocked may be returned. According to one embodiment, the third script may be directed to target these virtual ports (e.g., identified ports) and return parameters showing their purpose as it tries to force denials.

For the one or more identified ports, the system may run a third script to force one or more denials on the one or more identified ports. Based on the forced one or more denials, the system may determine network device transiting data attributes, which may include allowed protocols and directionality for each of the identified ports. Because port 109, in this example, subsumes a virtual port range, no status will be returned effectively allowing an analyst to know that the virtualization occurred. In a similar exemplary embodiment, simulating that instead of virtualization, malware had been installed on port 109 listening for and intercepting certain traffic, the third script would obtain a denial into the network allowing the system to know directionality is outbound for an unknown/unallowed protocol. Assuming the purpose is aligned with business need, documentation and known network state can be updated for the port. If not, these operations on the exemplary port would be recognized as shadow assets and handled accordingly. Optionally, the system may generate a network identification database based on the determined directionality. By employing denied paths, the system analyzes more than just approved network states, and provides one or more parameters identifying network ports to appliances that do not allow operation.

For convenience and ease of discussion, implementations of the disclosed technology are described above in connection with a financial or banking account associated with a user. It is to be understood that the disclosed implementations are not limited to financial service provider or banking accounts and are applicable to various other accounts associated with a user's sensitive information (e.g., utility/service accounts, medical information, and various other sensitive information).

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for determining network device transiting data attributes, the system comprising:
    one or more processors; and
    memory storing instructions that, when executed, cause the one or more processors to:
        run a first script on a first port of a network, wherein the first script returns one or more parameters for the first port;
        run a second script on second port of the network, wherein the second script returns one or more parameters for the second port;
        parse the returned one or more parameters for the first port and the returned one or more parameters for the second port to designate one or more identified ports for additional analysis; and
        produce a report for the one or more identified ports indicating a first variance in an established control mechanism of the network, the first variance identifying where the established control mechanism is predicted to fail.

2. The system of claim 1, wherein the instructions further cause the one or more processors to:
    identify one or more shadow assets by comparing differences between the returned one or more parameters for the first port and the returned one or more parameters for the second port.

3. The system of claim 2, wherein the one or more shadow assets comprise one or more inactive shadow assets.

4. The system of claim 1, wherein the instructions further cause the one or more processors to:
    identify one or more network anti-patterns by comparing of a first output from running the first script and a second output from running the second script.

5. The system of claim 1, wherein:
    the report is a target/hit view report,
    the report further indicates a second variance in the established control mechanism, the second variance indicating where the established control mechanism has failed, and the established control mechanism comprises one or more of a policy or a rule of the network.

6. The system of claim 1, wherein the first script on the first port returns a path and a destination address for the first port of the network, and wherein the first port is one or more static port and the second port is one or more known port.

7. The system of claim 1, wherein the first port comprises a network destination and firewall location of the network.

8. The system of claim 1, wherein the second script on the second port returns a path and a destination address for the second port of the network and identifies a temporarily allowed session for the second port.

9. The system of claim 1, wherein the first port of the network comprises one or more of known active, virtual, and non-active ports of the network.

10. The system of claim 1, wherein the parameters returned by the first script and the second script comprises an allowed state of a first port, a protocol, a input interface, a source protocol, a source mask, a source port, a output interface, a destination protocol, a destination mask, a destination port, or combinations thereof.

11. The system of claim 1, wherein a first identified port of the one or more identified ports is designated based on a protocol and a device type to target one or more of network ports and one or more network appliances.

12. The system of claim 11, wherein the instructions further cause the one or more processors to:
    capture the data attributes and directionality for the first identified port; and
    generate a database comprising at least a portion of the data attributes and the directionality for the first identified port.

13. The system of claim 1, wherein the instructions further cause the one or more processors to:
    schedule run time for the first script and run rime for the second script for timed targeting.

14. A method for network testing, comprising:
    running, via a computing device of a network, a first script on a first port of the network to return one or more parameters for the first port;
    running, via the computing device, a second script on a second port to return one or more parameters for the second port;
    parsing, via the computing device, the returned one or more parameters for the first port and the returned one or more parameters for the second port to designate at least a first identified port of one or more identified ports; and
    determining, via the computing device, one or more variances that indicate that an established control mechanism of the network has failed or is predicted to fail for at least the first port.

15. The method of claim 14, further comprising:
    identifying one or more shadow assets operating in the network based on the one or more variances and by comparing differences between the returned one or more parameters for the first port and the returned one or more parameters for the second port.

16. The method of claim 15, wherein the one or more shadow assets comprise one or more inactive shadow assets.

17. The method of claim 14, wherein at least the first identified port of the one or more identified ports is designated based on a protocol and a device type to target one or more of network ports and one or more network appliances.

18. The method of claim 17, further comprising:
capturing data attributes and directionality for at least the first identified port; and
generating a database comprising at least a portion of the data attributes and the directionality for the first identified port.

19. The method of claim 14, further comprising identifying one or more network anti-patterns by comparing of a first output from running the first script and a second output from running the second script.

20. The method of claim 14, wherein the established control mechanism comprises one or more of a policy or a rule of the network, and wherein the first port is one or more static ports and the second port is one or more known ports.

* * * * *